(12) United States Patent
Burtch

(10) Patent No.: US 7,948,101 B2
(45) Date of Patent: May 24, 2011

(54) APPARATUS FOR PRODUCTION OF HYDROGEN GAS USING WIND AND WAVE ACTION

(76) Inventor: John Christopher Burtch, Scarborough (CA)

( * ) Notice: Subject to any disclaimer, the term of this patent is extended or adjusted under 35 U.S.C. 154(b) by 347 days.

(21) Appl. No.: 12/065,029

(22) PCT Filed: Sep. 1, 2006

(86) PCT No.: PCT/CA2006/001447
§ 371 (c)(1),
(2), (4) Date: Feb. 27, 2008

(87) PCT Pub. No.: WO2007/025387
PCT Pub. Date: Mar. 8, 2007

(65) Prior Publication Data
US 2008/0231053 A1    Sep. 25, 2008

Related U.S. Application Data

(60) Provisional application No. 60/713,383, filed on Sep. 2, 2005.

(51) Int. Cl.
*F03D 9/00*      (2006.01)
*H02P 9/04*      (2006.01)
*F03B 13/00*     (2006.01)
*F03B 13/10*     (2006.01)
*F03B 13/12*     (2006.01)

(52) U.S. Cl. .............. 290/44; 290/43; 290/53; 290/54; 290/55

(58) Field of Classification Search .............. 290/43, 290/44, 53, 54, 55
See application file for complete search history.

(56) References Cited

U.S. PATENT DOCUMENTS
1,018,678 A * 2/1912 Nelson .................. 290/4 D
(Continued)

FOREIGN PATENT DOCUMENTS
CA        1065275       6/1913
(Continued)

OTHER PUBLICATIONS

Internet archive for http://www.theodoregray.com/PeriodicTable/Stories/001.1/, dated Mar. 20, 2003 as established by Internet Archive WayBackMachine at http://web.archive.org/web/*/http://www.theodoregray.com/PeriodicTable/Stories/001.1/.

(Continued)

*Primary Examiner* — T C Patel
*Assistant Examiner* — Pedro J Cuevas
(74) *Attorney, Agent, or Firm* — Bereskin & Parr LLP/S.E.N.C.R.L., s.r.l.

(57) ABSTRACT

A platform apparatus for producing hydrogen gas from water includes a buoyant base configured for floating in a body of water, such as on the ocean, a vertical support member extending upwardly from the base, a wind turbine rotatably coupled to the support member for transforming the kinetic energy of wind into rotational energy, a generator coupled to the wind turbine for transforming the rotational energy generated into DC electricity, and an electrolysis apparatus affixed to the platform for using the electricity to extract hydrogen gas from water by the process of hydrolysis. The electrolysis apparatus preferably comprises an exchange chamber for storing water collected from the body of water, a pair of corrosion resistant electrodes, and a gas collection apparatus for collecting the hydrogen gas produced by electrolysis. The platform apparatus preferably includes a pumping apparatus powered by wave motion of the body of water for supplying water to the electrolysis apparatus. A gearing system preferably allows the generator to be driven at a greater rotational speed than the wind turbine.

19 Claims, 7 Drawing Sheets

U.S. PATENT DOCUMENTS

| | | | | |
|---|---|---|---|---|
| 1,078,323 A * | 11/1913 | Trull | | 417/332 |
| 3,274,941 A * | 9/1966 | Parr | | 417/331 |
| 3,484,617 A * | 12/1969 | Winsel | | 290/44 |
| 3,603,804 A * | 9/1971 | Casey | | 290/42 |
| 3,754,147 A * | 8/1973 | Hancock et al. | | 290/53 |
| 3,758,788 A * | 9/1973 | Richeson | | 290/42 |
| 4,023,515 A * | 5/1977 | Tharaldson | | 114/256 |
| 4,037,989 A * | 7/1977 | Huther | | 416/197 A |
| 4,058,979 A * | 11/1977 | Germain | | 60/327 |
| 4,077,213 A * | 3/1978 | Hagen | | 60/500 |
| 4,098,084 A * | 7/1978 | Cockerell | | 60/500 |
| 4,105,368 A | 8/1978 | Waters et al. | | 417/53 |
| 4,107,023 A | 8/1978 | Mentz et al. | | 204/269 |
| 4,118,932 A * | 10/1978 | Sivill | | 60/500 |
| 4,125,346 A * | 11/1978 | Pickle | | 417/332 |
| 4,159,427 A * | 6/1979 | Wiedemann | | 290/55 |
| 4,184,084 A | 1/1980 | Crehore et al. | | 290/55 |
| 4,196,591 A * | 4/1980 | Wallace | | 60/497 |
| 4,204,406 A * | 5/1980 | Hopfe | | 60/398 |
| 4,210,821 A * | 7/1980 | Cockerell | | 290/53 |
| 4,241,579 A * | 12/1980 | Borgren | | 60/504 |
| 4,302,161 A * | 11/1981 | Berg | | 417/333 |
| 4,335,093 A | 6/1982 | Salomon et al. | | 423/644 |
| RE31,111 E * | 12/1982 | Hagen | | 60/500 |
| 4,413,956 A * | 11/1983 | Berg | | 417/333 |
| 4,495,424 A * | 1/1985 | Jost | | 290/53 |
| 4,684,815 A * | 8/1987 | Gargos | | 290/53 |
| 4,686,377 A * | 8/1987 | Gargos | | 290/53 |
| 4,768,932 A * | 9/1988 | Geberth, Jr. | | 417/552 |
| 4,792,290 A * | 12/1988 | Berg | | 417/332 |
| 4,883,823 A | 11/1989 | Perry, Jr. et al. | | 518/702 |
| 4,954,052 A | 9/1990 | Simmons et al. | | 417/331 |
| 5,394,695 A * | 3/1995 | Sieber | | 60/398 |
| 5,411,377 A * | 5/1995 | Houser et al. | | 417/333 |
| 5,592,028 A * | 1/1997 | Pritchard | | 290/55 |
| 5,900,330 A * | 5/1999 | Kagatani | | 429/17 |
| 6,045,339 A | 4/2000 | Berg et al. | | 417/332 |
| 6,100,600 A * | 8/2000 | Pflanz | | 290/54 |
| 6,211,643 B1 * | 4/2001 | Kagatani | | 320/101 |
| 6,294,844 B1 * | 9/2001 | Lagerwey | | 290/55 |
| 6,305,442 B1 * | 10/2001 | Ovshinsky et al. | | 141/231 |
| 6,459,231 B1 * | 10/2002 | Kagatani | | 320/101 |
| 6,519,951 B2 * | 2/2003 | Ovshinsky et al. | | 62/46.2 |
| 6,833,631 B2 * | 12/2004 | Van Breems | | 290/42 |
| 6,918,350 B1 | 7/2005 | Morse et al. | | 114/382 |
| 7,075,189 B2 * | 7/2006 | Heronemus et al. | | 290/44 |
| 7,146,918 B2 * | 12/2006 | Meller | | 114/39.26 |
| 7,525,213 B2 * | 4/2009 | Nagata et al. | | 290/53 |
| 7,629,703 B2 * | 12/2009 | Storbekk | | 290/53 |
| 7,726,911 B1 * | 6/2010 | Dempster | | 405/210 |
| 2001/0025670 A1 * | 10/2001 | Ovshinsky et al. | | 141/231 |
| 2002/0145288 A1 * | 10/2002 | Van Breems | | 290/42 |
| 2003/0168864 A1 * | 9/2003 | Heronemus et al. | | 290/55 |
| 2005/0252764 A1 * | 11/2005 | Meller | | 204/242 |
| 2006/0162642 A1 | 7/2006 | Morse et al. | | 114/382 |
| 2007/0138021 A1 * | 6/2007 | Nicholson | | 205/628 |
| 2007/0145748 A1 * | 6/2007 | Pierz | | 290/43 |
| 2007/0269304 A1 * | 11/2007 | Burg | | 415/4.2 |
| 2008/0047502 A1 * | 2/2008 | Morse | | 123/3 |
| 2008/0088133 A1 * | 4/2008 | Nagata et al. | | 290/53 |
| 2008/0122225 A1 * | 5/2008 | Smith | | 290/42 |
| 2009/0196763 A1 * | 8/2009 | Jones et al. | | 416/90 R |
| 2009/0285688 A1 * | 11/2009 | Ortiz | | 416/197 A |
| 2010/0116684 A1 * | 5/2010 | Sawyer | | 205/628 |
| 2010/0194115 A1 * | 8/2010 | Jakubowski et al. | | 290/55 |
| 2010/0207393 A1 * | 8/2010 | Roberts | | 290/54 |
| 2010/0237625 A1 * | 9/2010 | Dempster | | 290/54 |
| 2010/0244450 A1 * | 9/2010 | Tabe | | 290/53 |
| 2010/0244451 A1 * | 9/2010 | Ahdoot | | 290/53 |
| 2010/0258449 A1 * | 10/2010 | Fielder | | 205/628 |
| 2010/0259044 A1 * | 10/2010 | Muchow | | 290/43 |

FOREIGN PATENT DOCUMENTS

| | | |
|---|---|---|
| CA | 2207116 | 10/1916 |
| CA | 2391538 | 12/1945 |
| CA | 1200367 | 2/1986 |
| DE | 36 22 119 | 1/1988 |

OTHER PUBLICATIONS

Internet archive for http://chem.lapeer.org/Chem2Docs/chlorine.html dated Jul. 12, 2000 as established by Internet Archive WayBackMachine at http://web.archive.org/web/*/http://chem.lapeer.org/Chem2Docs/chlorine.html.

PCT, International Search Report, PCT Application No. PCT/CA2006/001447, dated Dec. 27, 2006.

PCT International Preliminary Report on Patentability, PCT Application No. PCT/CA2006/001447, dated Dec. 28, 2007.

* cited by examiner

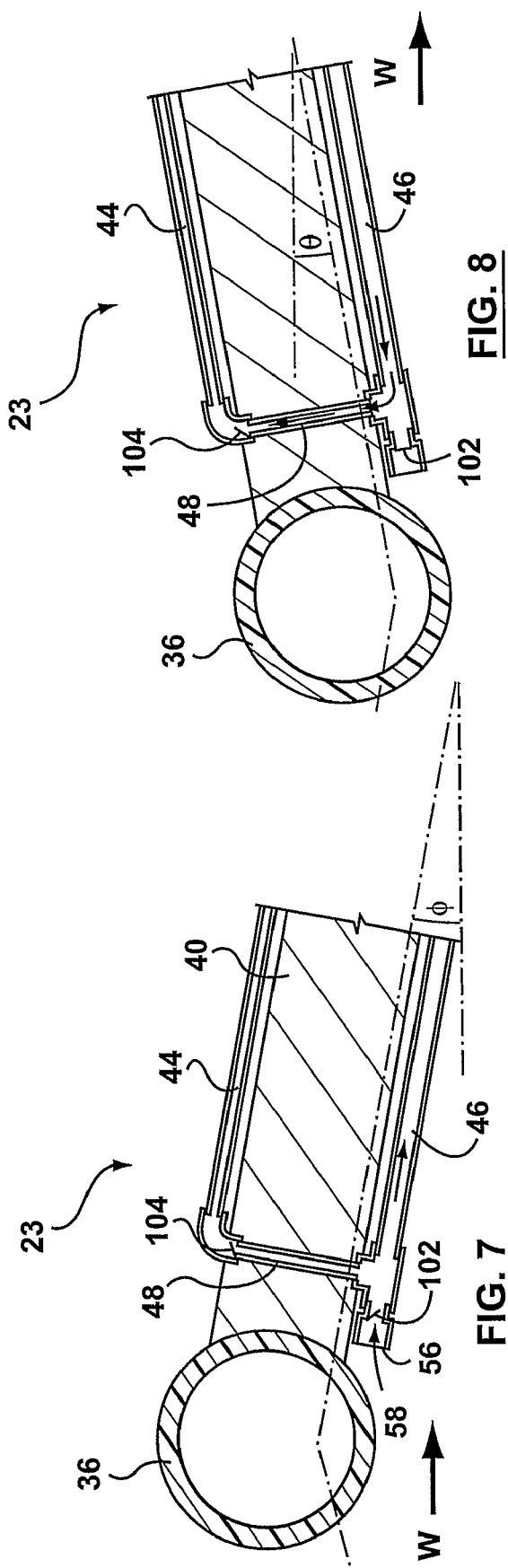
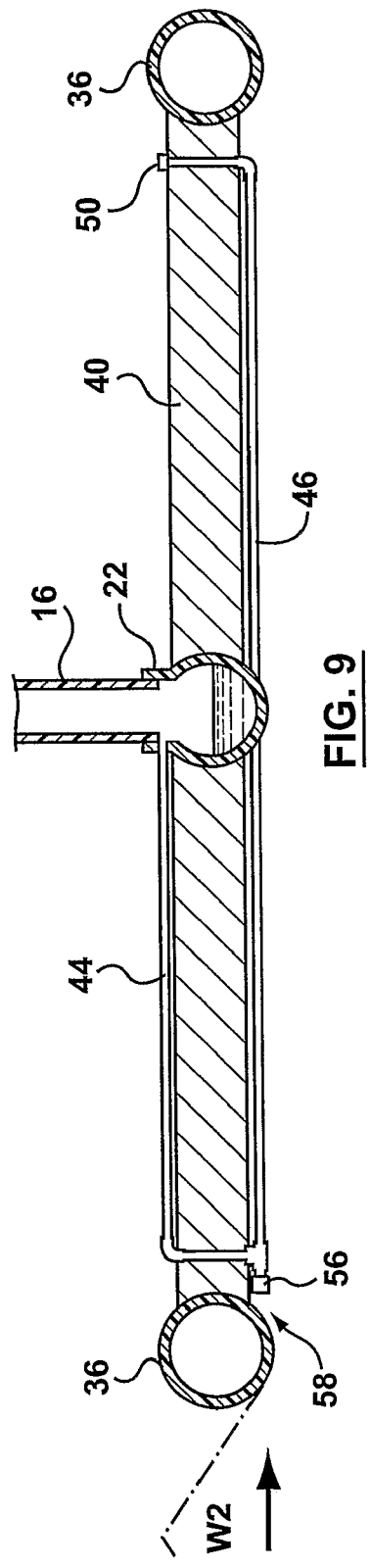

US 7,948,101 B2

APPARATUS FOR PRODUCTION OF HYDROGEN GAS USING WIND AND WAVE ACTION

FIELD OF THE INVENTION

The present invention relates to apparatus for producing hydrogen gas, and in particular to apparatus for producing hydrogen gas through electrolysis of water.

BACKGROUND OF THE INVENTION

The process of extracting Hydrogen gas from water by electrolysis has been known since at least the 1800's. Many of the technological advancements that have occurred since then center around how the electricity necessary for electrolysis is produced. Originally, batteries were used as the primary source of the direct current (DC) electricity necessary for electrolysis. Currently, however, most electricity comes from power sources such as hydro dams, coal, and nuclear plants and most recently from wind and solar power. These modern electricity sources typically generate alternating current (AC) electricity, which must be converted into DC electricity for use in electrolysis through rectification.

Current electricity sources are incapable of supplying the large amounts of electricity that are becoming necessary for new uses, such as for generating hydrogen gas necessary to power fuel cell automobiles. It is clear that hydrogen production on a large scale must have its own source of electricity.

Current hydrogen generating systems also suffer from a lack of scalability, and are not easily configured to meet varying demand for hydrogen gas production. Furthermore, water must often be pumped to fixed locations for producing hydrogen gas using electrolysis, which is costly and expensive.

There is accordingly a need in the art for an apparatus that is capable of meeting the growing demands for hydrogen production, and of adapting to meet varying demand for hydrogen gas production.

SUMMARY OF THE INVENTION

The present invention is directed to a platform apparatus for producing hydrogen gas comprising a buoyant base configured for floating on a body of water, such as on the ocean. The apparatus comprises a support member extending vertically from the base supporting a wind turbine rotationally coupled to the vertical support member for transforming the kinetic energy of wind into rotational energy. A generator is coupled to the wind turbine for transforming the rotational energy generated into direct current (DC) electrical energy. This DC electricity is used to power an electrolysis apparatus to create hydrogen gas from water collected from the body of water.

In a preferred embodiment, the electrolysis apparatus comprises a pair of carbon electrodes, located within an exchange chamber for storing water, the electrodes being electrically connected to the generator and submerged for passing DC electricity through the collected water, and a gas collection apparatus for collecting the hydrogen gases. The apparatus preferably has a pumping apparatus that uses wave motion of the body of water to pump water into the electrolysis apparatus.

The present invention is also directed to an array of interconnected platforms for scalable production of hydrogen gas. A plurality of platform apparatus are linked together using flexible connection means allowing each platform in the array to move independently to allow for pumping, but wherein the entire array stays together.

BRIEF DESCRIPTION OF THE DRAWINGS

FIGS. 7 and 8 are detailed side views of the pumping apparatus in operation as the apparatus passes over a wave;

FIG. 9 is a cross section side view of the pumping apparatus on the apparatus along line A-A from FIG. 1.

DETAILED DESCRIPTION

Figure 1:
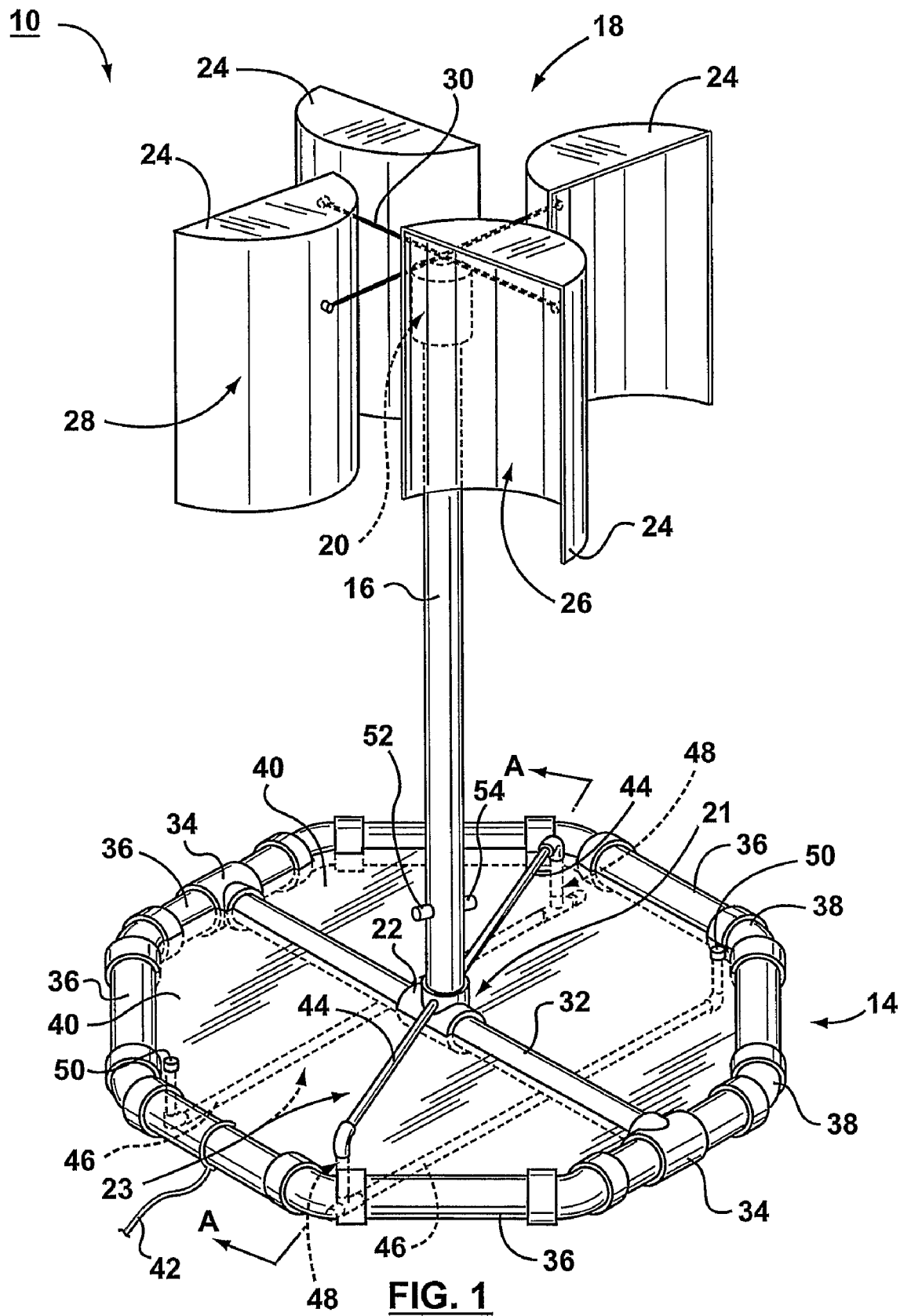
FIG. 1 is a perspective view of a platform apparatus made in accordance with a preferred embodiment of the invention.
Figure 2:
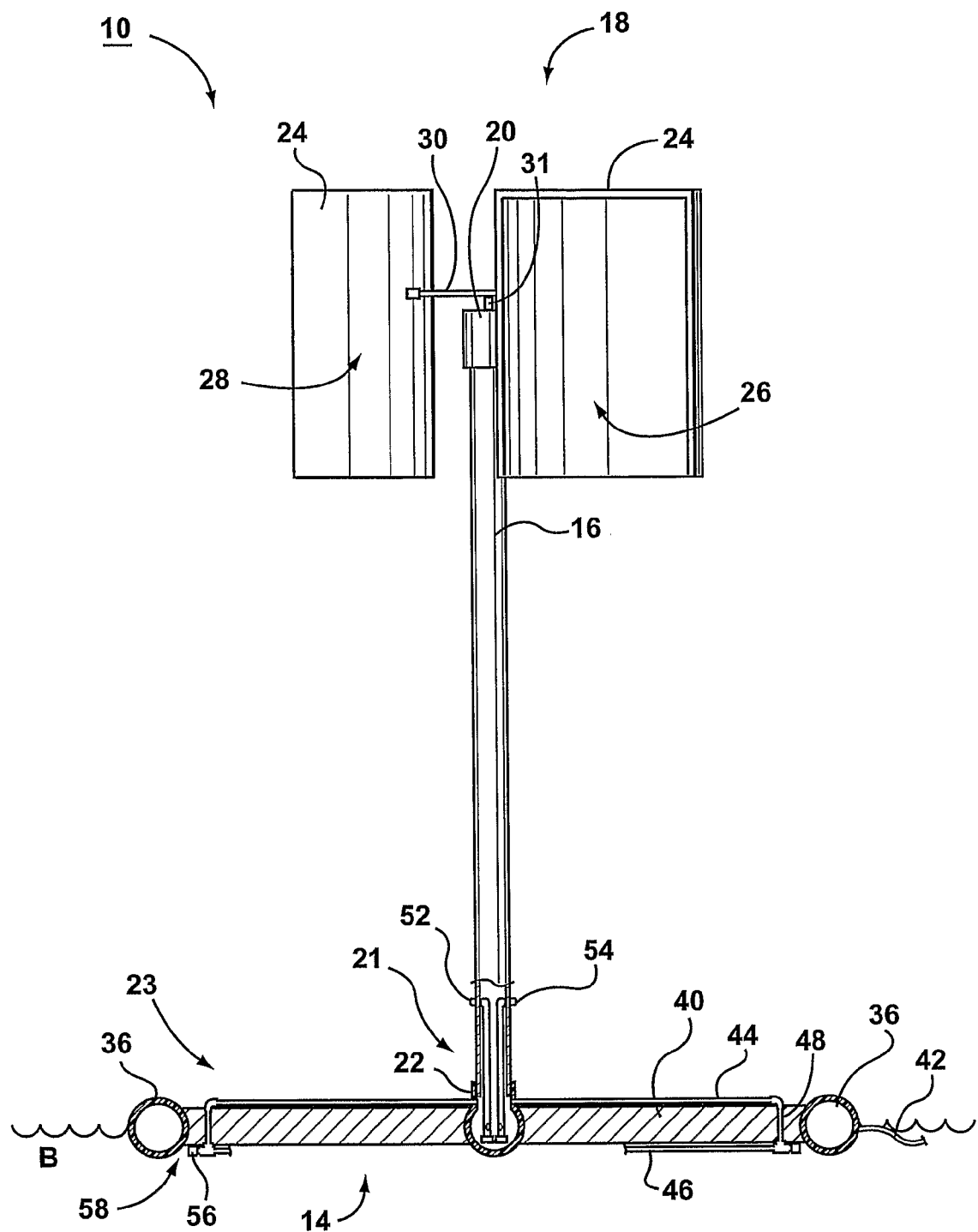
FIG. 2 is an elevation view of the apparatus shown in FIG. 1.
Figure 3:
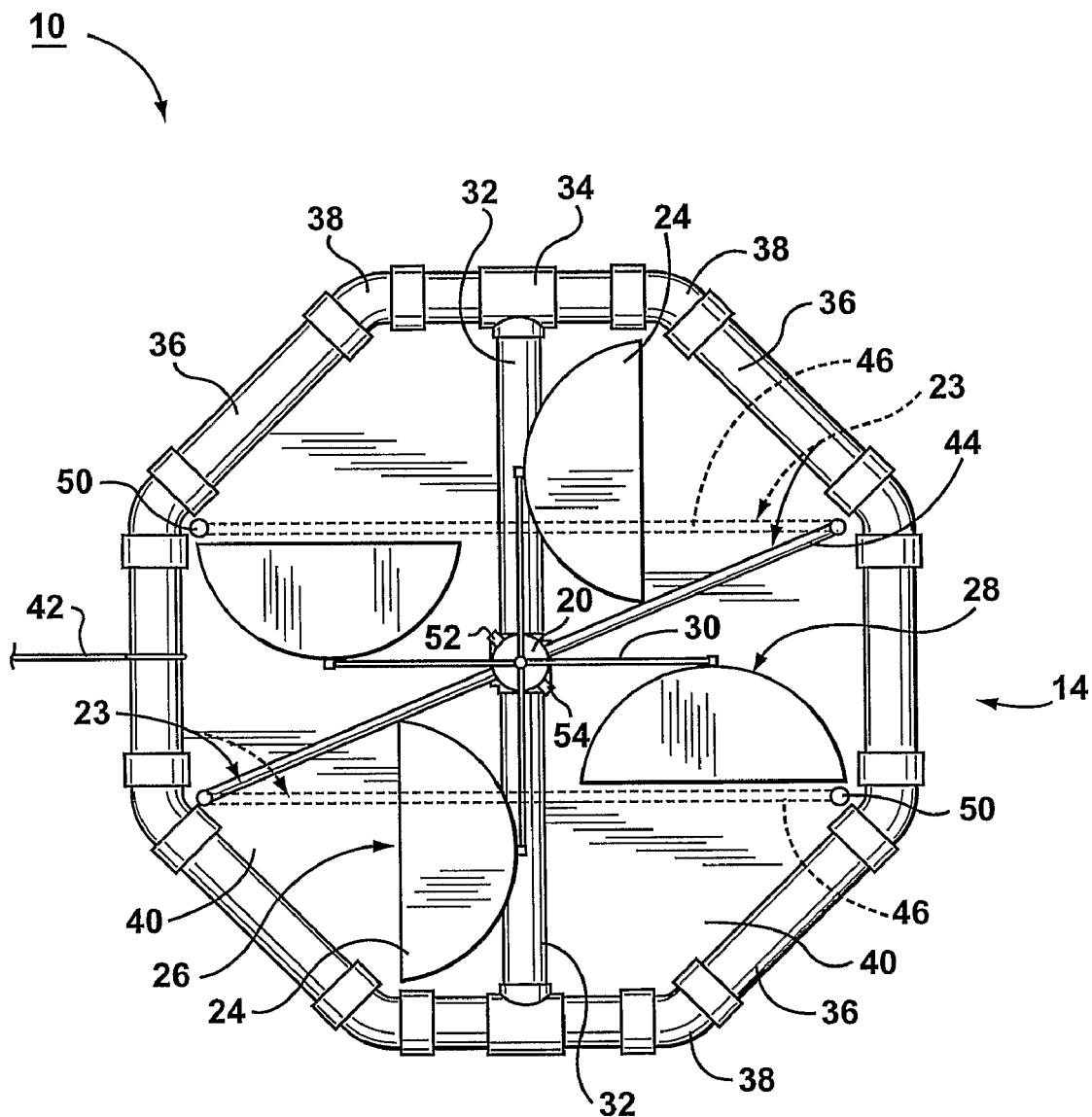
FIG. 3 is a top plan view of the apparatus shown in FIG. 1.

Referring to FIGS. 1, 2 and 3, illustrated therein is a platform apparatus 10 for producing hydrogen gas in accordance with a preferred embodiment of the invention. The apparatus 10 comprises a buoyant base 14 configured for floating on a body of water B such as an ocean, a support member 16 extending vertically from the base 14, a wind turbine 18 rotationally coupled to the vertical support member 16 for transforming the kinetic energy of wind into rotational energy, and a generator 20 coupled to the wind turbine 18 for transforming rotational energy generated by the wind turbine 18 into direct current (DC) electrical energy. This DC electricity is used to power an electrolysis apparatus shown generally as 21. The electrolysis apparatus 21 uses the electricity produced by the generator 20 to create hydrogen gas from water collected from the body of water B.

The apparatus 10 preferably further comprises a pumping apparatus shown generally as 23 that uses the wave motion of the body of water B to pump water from the body of water B to the electrolysis apparatus 21.

The wind turbine 18 comprises four wind scoops 24 preferably shaped as half cylinders, each having an inner concave surface 26 and an outer convex surface 28. The wind scoops 24 are fastened together using connecting rods 30, preferably made of thick-walled schedule-eighty PVC pipes, which are connected to a turbine drive shaft 31, which in turn is rotatably coupled to the generator 20. Wind passing by the apparatus 10 causes the wind turbine 18 to rotate thus turning the generator 20 to produce DC electricity. The amount of electricity produced varies generally depending on the wind velocity and gearing joining the wind turbine 28 to the generator 20, as is known in the art.

The opening of each wind scoop 24 is oriented to be perpendicular to next and previous wind scoops 24, as described with reference to FIG. 2, such that at any given time, the concave surfaces 26 will face four different perpendicular directions. Wind coming from any particular direction and passing by the apparatus 10 will exert different pressures on each of the wind scoops 24 in accordance with whether the convex 28 or concave 26 surface is facing the wind direction.

In particular, wind flowing into a concave surface 26 will tend to exert greater pressure than wind flowing over a convex surface 28, as is well known in the art. Thus, wind energy will turn the wind turbine 18 in a constant angular direction, in this case a counter-clockwise direction.

The vertical support member 16 is preferably made of resilient plastic tubing, such as ABS or PVC tubing. The vertical support member 16 is connected to the exchange chamber 22, which is preferably an ABS tube T-junction, and to a horizontal base member 32, preferably also made of ABS or PVC pipe. The horizontal base member 32 is generally hollow and filled with air or other gas, and is sealed off from the exchange chamber 22 such that when the exchange chamber 22 contains water, the water will not flood the horizontal base member 32.

Horizontal base member 32 is also secured to T-members 34 and then to a number of outer base members 36, the outer base members 36 being joined together using elbow fittings 38 to define the outer edge of the base 14. The outer base members 36 and elbow fittings 38 are preferably hollow ABS or PVC tubes, filled with air or other gases to provide some buoyancy to the base 14.

The base 14 also comprises foam insert members 40, preferably made of Styrofoam, cut and shaped to fit in the spaces between the horizontal member 32 and the outer edge of the base 14 as defined by the outer base members 36. The foam inserts 40 are secured in place, preferably by using silicone. In preferred embodiments of the invention, fiberglass is also placed over the upper and lower surfaces of the foam inserts 40 for improved strength and protection.

The base 14 is sized and shaped to be buoyant, such that the entire apparatus 10, including the weight of the generator 20, wind turbine 18 and vertical support member 16 will float when placed in the body of water B. The base 14 is further sized and shaped to remain stable while supporting the weight of the generator 20, wind turbine 18 and vertical support member 16 such that the apparatus 10 will remain upright when floating on the body of water B during normal wave motion.

The base 14 may be shaped in any number of possible configurations, but the outer edge of the base is preferably hexagonal or octagonal to provide increased stability and to allow multiple apparatus 10 to be joined and packed tightly together to form an array of interconnected platform apparatus 10 capable of producing greater quantities of hydrogen gas.

The apparatus 10 may also be secured by an anchor line 42 to anchors that keep the apparatus 10 from drifting away from a particular location, the anchors preferably located on the bed of the body of water. The anchor line 42 is sufficiently slack to allow the apparatus 10 to move with changing tides and water levels, and to float above the largest wave swells that are commonly experienced when anchored in a particular location.

Pumping apparatus 23 comprises upper feed lines 44 connected to lower pump tubes 46 through vertical tubes 48, and to air inlets 50, as shown in more detail in FIGS. 7 and 8. Upper feed lines 44 are connected to the electrolysis apparatus 21 to provide water to the electrolysis apparatus 21 during pumping.

Feed lines 44, lower pump tubes 46 and vertical tubes 48 are preferably made from resilient plastic such as PVC and are affixed to the base 14 using silicone. In the preferred embodiment, they are further secured to the upper surface of the base 14 using fiberglass so that they are protected from waves breaking over the platform 12.

FIG. 1 also shows a hydrogen gas outlet 52 and a chlorine gas outlet 54, which are connected through the vertical support member 16 to the electrolysis apparatus 21, as discussed in more detail below with respect to FIG. 5.

During operation, the base 14 of the apparatus 10 rests on the body of water B, such as an ocean, sea or lake. Water is taken in to the lower pump tubes 46 through an intake screen 56 at water inlets 58. The water is then pumped up to the feed lines 44 by operation of the pumping apparatus 23 as the base 14 oscillates with the wave motion of the body of water B.

The vertical support member 16 supports the generator 20 and the wind turbine 18 well above the surface of the body of water B, providing two benefits. First, it minimizes the risk that the generator 20 will be exposed to water from the body of water B, which may be highly corrosive seawater, and which could damage the generator 20 and associated gearing or interfere with its operation. Second, this allows the wind turbine 18 to be exposed to optimum wind conditions. Wind traveling along near the surface of a body of water tends to interact with the water, generating waves and slowing the wind, reducing the amount of kinetic energy available. By positioning the wind turbine 18 a sufficient pre-determined distance away from the surface of the body of water B, according to the wind conditions in a particular location, the wind turbine 18 experiences optimum, relatively undisturbed wind with the greatest amounts of kinetic wind energy. It will be obvious to those skilled in the art that the length of the vertical support member 16 and the size of the base 14 can be adjusted to accommodate varying wind conditions and stability requirements.

The outer octagonal form of the base 14 as defined by outer base members 36 and elbow members 38 is shown clearly in FIG. 3. In a preferred embodiment, two pumping apparatus 23 are provided to allow operation of the apparatus 10 to continue should one of the pumping apparatus 23 become temporarily clogged.

Figure 4:
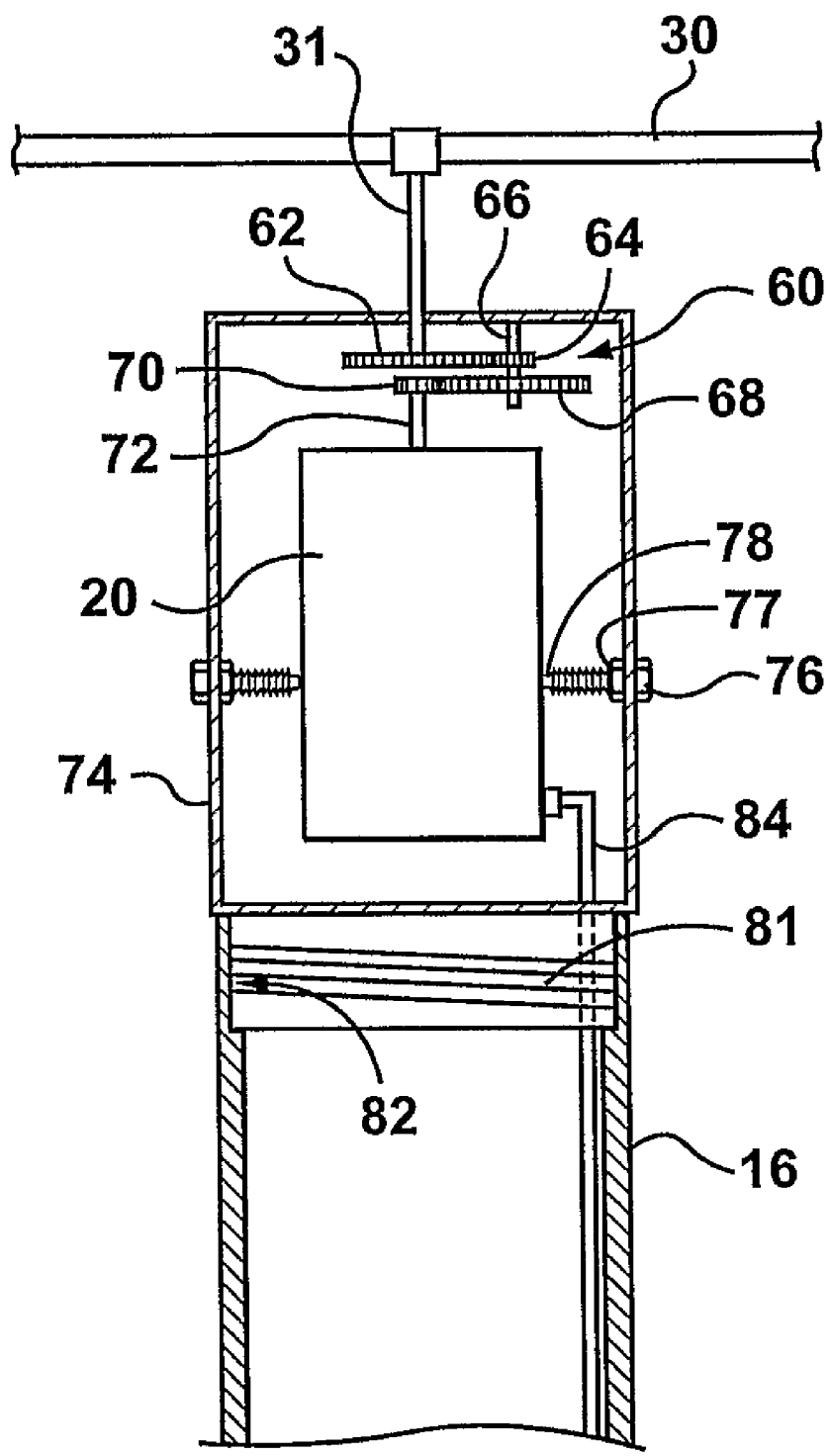
FIG. 4 is a detailed side view of a generator on the apparatus shown in FIG. 1.

Referring now to FIG. 4, the wind turbine 18 is preferably coupled to the generator 20 by means of a gearing system shown generally as 60, mounted within a watertight housing 74. Gearing system 60 comprises a first large gear 62, mounted on turbine drive shaft 31, which engages with a first small gear 64 mounted on a secondary shaft 66 also rotatably mounted within watertight housing 74. Gearing system 60 also comprises a second large gear 68 mounted on the secondary shaft 66 that engages with a second small gear 70 mounted on the drive shaft 72 of the generator 20. The gearing system 60 is configured for driving the generator 20 at a rotational speed greater than the rotational speed of the wind turbine 18, as necessary for optimum operation of the generator 20.

In a preferred embodiment, the ratio of the number gear teeth on the small gears 66, 70 to the number of gear teeth on the large gears 62, 68 is 1:5, such that every one rotation of a large gear 62, 68 will cause a small gear 66, 70 to rotate five times. Thus, in the preferred embodiment, every one rotation of turbine drive shaft 31 will cause the drive shaft 72 of the generator 20 to rotate twenty-five times. It will be understood by those skilled in the art that the configuration of the gearing system 60 can be varied according to the operating characteristics of the generator 20 and wind turbine 18, the configuration of the watertight housing 74, as well as the common wind characteristics in a particular location, in order to obtain optimum electricity generation.

The generator 20 is located inside the watertight housing 74, which is preferably made of ABS plastic and shaped as two half cylinders joined together for enclosing the generator 20. The generator 20 is mounted to the housing 74 by a series of bolts 76 and nuts 77. In a preferred embodiment, eight bolts 76 are placed through the outside of the housing 74 and eight nuts 77 on the inside have felt pads 78 to cushion the area that rests against the outer surface of the generator 20. The housing 74 also has a male threaded portion 81 for engaging with a matching female threaded portion 82 on the inner surface of the upper end of the vertical support member 16. The housing 74 can therefore be removably secured to the vertical support member 16 so that the generator 20 and interior of the vertical support member 16 can be easily accessed for maintenance or repairs. An insulated electrical wire 84 electrically connects the generator 20 to the electrolysis apparatus to supply the DC electricity necessary for electrolysis.

The generator 20 can be any generator suitable for use with wind turbine 18, such as wind powered generators that are commercially available in the United States from Windstream Power LLC (http://www.windstreampower.com). For a small scale apparatus 10 having a base 14 approximately five feet in diameter and a vertical support member 18 approximately six feet in length, Windstream Power generator model no. 443540 could be used, which is a permanent magnet generator capable of generating approximately 3 amps of DC electricity when the shaft is rotated at 2000 rpm.

Figure 6:
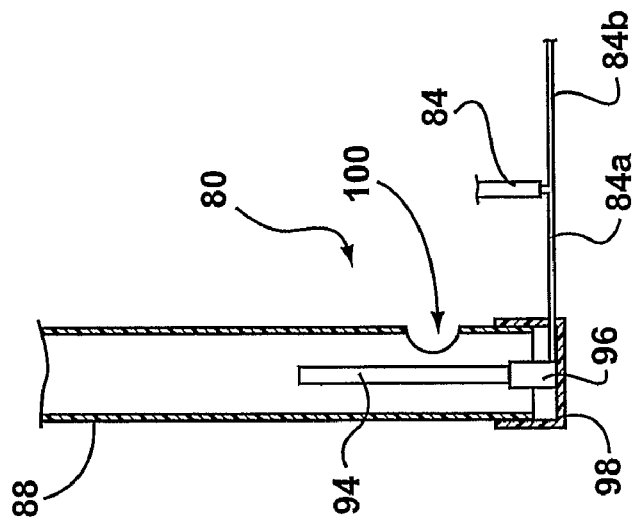
FIG. 6 is a more detailed side view of a cathode electrode housed within the electrolysis apparatus shown in FIG. 5.
Figure 5:
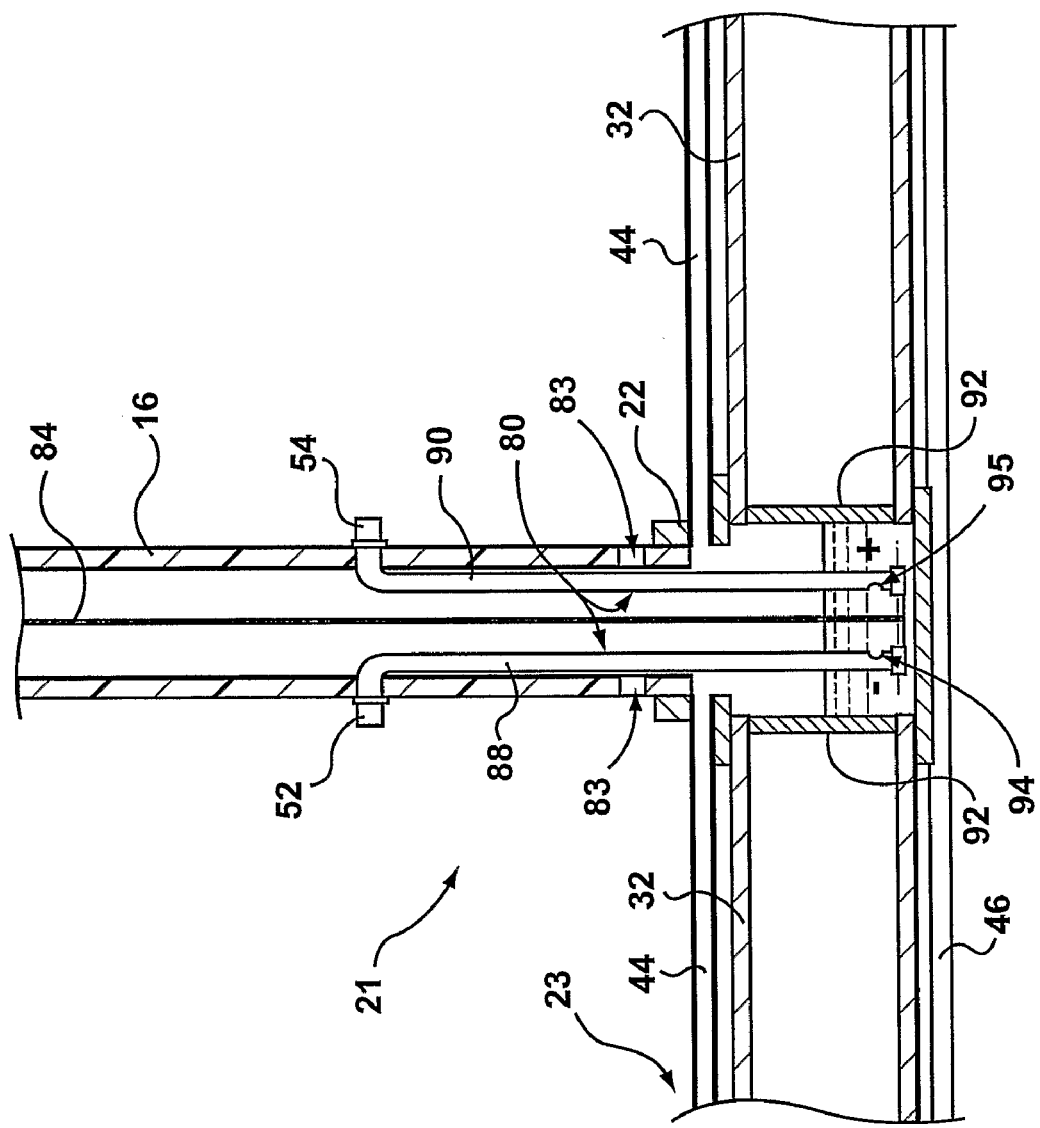
FIG. 5 is a detailed side view of the electrolysis apparatus for the apparatus shown in FIG. 1.

Referring now to FIGS. 5 and 6, illustrated therein is a preferred embodiment of the electrolysis apparatus 21 in accordance with the present invention, comprising exchange chamber 22 and a pair of electrodes, a cathode 94 and an anode 95, preferably made of carbon or platinum or some other suitably material that is resistant to corrosion. Insulated wire 84 is shown coming from the generator 20 through the vertical support member 16 to the electrolysis apparatus 21. The water feed lines 44 and lower pump tubes 46 are also shown, as is horizontal base member 32.

Electrolysis apparatus 21 also includes a gas collection apparatus, shown generally as 80, comprising a hydrogen gas collection tube 88 running from the cathode 94 (labeled "−") to the hydrogen gas outlet 52, and a chlorine gas collection tube 90 running from the anode 95 (labeled "+") to the chlorine gas outlet 54. The exchange chamber 22 is sealed off from the horizontal base member 32 by airtight sealing discs 92, preventing water in the exchange chamber 22 from flooding the horizontal base member 32.

The vertical support member 16 is removably threaded into the exchange chamber 22 so that the electrodes 94,95 and gas collection tubes 88, 90 can be accessed for cleaning and maintenance as required, and to allow for disassembly for easier storage and transportation of the platform. The exchange chamber 22 also preferably comprises outlet holes 83 positioned near the feed lines 44 such that as the exchange chamber 22 becomes filled with water, excess water can be drained out. This also allows any excess ions or salts created during electrolysis such as Na+, OH— and NaOH to be removed from the exchange chamber 22.

During operation of the electrolysis apparatus 21, the water feed lines 44 supply water, preferably saltwater, from the body of water B into the exchange chamber 22. DC electricity flows from the cathode 94 to the anode 95 through this water. Reduction of hydrogen gas takes place at the cathode 94, while preferably oxidization of chlorine gas occurs at the anode 95, when the water has a sufficient salt content, according to the following chemical equation:

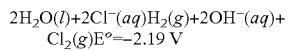
$$2H_2O(l) + 2Cl^-(aq) H_2(g) + 2OH^-(aq) + Cl_2(g) E° = -2.19 V$$

As is well known in the art, hydrogen gas can be generated at the cathode 94 with virtually any voltage source connected to the electrodes. However, in order to generate chlorine gas at the anode 95, it is necessary to have a voltage source of at least +2.19 Volts connected to the electrodes.

The hydrogen gas collection tube 88 collects the hydrogen gas that forms around the cathode 94 and directs the hydrogen gas to the hydrogen gas outlet 52 where it can be used immediately or pumped into storage tanks, such as may be mounted on the base 14, on land or on tanker ships coupled to the hydrogen gas outlet 52 using flexible hosing. Gas collection tube 90 performs a similar task, collecting the chlorine gas as it forms at the anode 95 and directing it though the chlorine gas outlet 54 for immediate use or storage.

Referring to FIG. 6, hydrogen gas collection tube 88 is shown surrounding the cathode 94. The electrode 94 is held upright by, and electrically connected to, a small copper tube 96 that is drilled and glued through an end cap 98. The negative half 84a of the insulated wire 84 from the generator 20 is electrically connected to the copper tube 96, and coated in silicone covering the copper to prevent corrosion. The positive half 84b of the insulated wire 84 runs to a similar carbon electrode operating as the anode 95, not shown in FIG. 6, for chlorine gas production. The hydrogen gas collection tube 88 has an opening 100 that allows the cathode 94 to be exposed to water in the exchange chamber 22.

During operation of the electrolysis apparatus 21, hydrogen gas bubbles form on the surface of the cathode 94, and being less dense than the surrounding water, will float up through the hydrogen gas collection tube 88 to the hydrogen gas outlet 52.

The anode 95 used for collection of chlorine gas is of substantially the same design, and for brevity is not shown or described in detail.

FIGS. 7, 8 and 9 show the details and the operation of the pumping apparatus 23. In FIG. 7, the base 14 of the apparatus 10 is shown floating in body of water B. Water feed line 44 is affixed to the top of the foam insert 40, while lower pump tube 46 is affixed to the bottom of the foam insert, and is submerged in the body of water B. Feed line 44 and lower pump tube 46 are connected by a vertical tube 48 that passes through the foam insert 40. Water inlet 56 is shown having intake screen 56 at the opening of the lower pump tube 46, with lower flap valve 102 that allows water to enter the lower pump tube 46 but resists flow out from the lower pump tube 46. An upper flap valve 104 performs a similar role in allowing water to flow into, but not exit, the water feed line 44.

The lower flap valve 102 and upper flap valve 104 are preferably made from vinyl and shaped, sized and mounted within the feed line 44 and pump tube 46 to allow water to pass in one direction, and resist water flowing in the opposite direction.

During a water inlet step, as shown in FIG. 7, the base 14 encounters a wave W moving from left to right. As the wave W contacts the leading edge of the base 14, the base 14 is tilted up through an angle φ. Water enters through the intake screen 56, with water pressure forcing the lower flap valve 102 open and allowing water to flow into the lower pump tube 46. The opposite end of the lower pump tube 46 is connected to the air inlet 50, as shown in FIG. 9, permitting air to escape and allowing water to flow freely into the lower pump tube 46. The lower pump tube 46 now contains a "charge" of water During a water-pumping step, as shown in FIG. 8, the wave W has moved past the leading edge of the base 14, and the base 14 is now tilted downward through angle θ, which is typically the same as angle φ. The "charge" of water taken in to the lower pump tube 46 in the water inlet step is forced by water pressure developed by the angle θ towards the lower flap valve 102, forcing it closed. If angle θ is sufficiently large, the water "charge" in the lower feed tube 46 will have enough pressure so as to be partially forced up the vertical tube 48 and through the upper flap valve 104 into the feed line 44. This may also be assisted by capillary action if the vertical tube 48 has a sufficiently narrow diameter. The feed line 44 now has a "charge" of water.

As the base 14 becomes horizontal again, such as just prior to encountering a new wave W2 as shown in FIG. 9, the upper flap valve 104 closes, trapping a portion of the water "charge" in the feed line 44, and feeding it along the feed line 44 into the exchange chamber 22. The lower pump tube 46 is positioned to receive a second water "charge" through the operation of the pumping mechanism 23 as described in the water inlet step above.

Thus, in this manner, the oscillating wave motion of a body of water B can be used to pump water up into the exchange chamber 22. It will be appreciated by those skilled in the art, however, that other pumping mechanisms relying on wave power or other power sources could be used to pump water into the exchange chamber.

Figure 10:
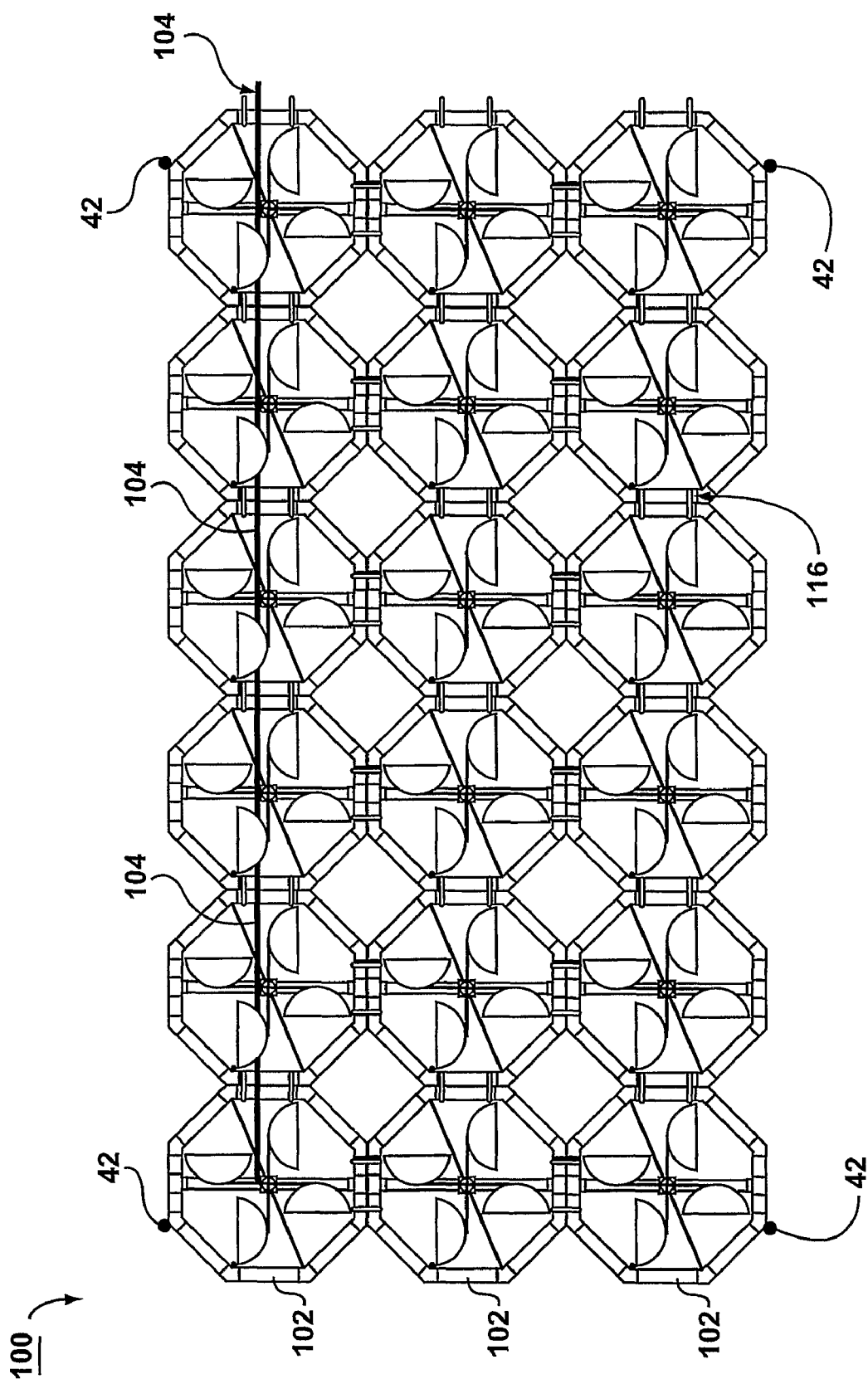
FIG. 10 is a top plan view of a system for producing hydrogen gas wherein multiple hydrogen producing apparatus as shown in FIG. 1 are joined together to form a floating array.

Referring now to FIG. 10, shown therein is a system 100 for generating hydrogen comprising eighteen floating platforms 102, each like platform apparatus 10 as described above, joined together to form an array 110 of interconnected platforms 102 according to one embodiment of the invention. In this way the benefits of one platform 102 can be scaled to provide different quantities of hydrogen and chlorine gas as required for a particular application. There is virtually no limit to the number of platforms 102 that might be joined together. The gases that are produced at each platform 102 could be collected in flexible hoses 104 for transportation to storage tanks, or put directly to use in a particular application.

In the preferred embodiment, adjacent platforms 102 are joined using braided vinyl straps 116 having release buckles. The use of braided straps 116 allows for each floating platform 102 to have limited amounts of independent movement, while preventing them from drifting apart or turning relative to each other. Anchors and anchor lines 42 can be attached to the array 110, preferably being placed at every sixth platform 102, to anchor the array 110 to the ocean bed, keeping the array 110 from turning or drifting. The anchor lines 42 are long enough to allow for tidal movement and to accommodate the largest waves that the array 110 would be exposed to in a particular location.

The use of the array 110 provides increased stability over an individual platform 102, and thus the array 110 is better able to resist bad weather, storms or excessive wave action without tipping or becoming inoperable.

It should be apparent to those skilled in the art that the apparatus of the present invention has a number of advantages over prior art apparatus. In particular, the present invention provides for a self-powered hydrogen gas generation apparatus usable on a body of water, eliminating the need to divert existing electricity to meet the growing demand for hydrogen gas. Furthermore, the present invention provides for a scalable flexible system that can be adapted to meet the hydrogen gas requirements of a particular location, and eliminates the need to pump water to a fixed location for hydrogen generation. It also provides the above benefits with respect to the production of chlorine gas, which can be used in a number of applications, including the purification of drinking water.

While the invention has been described with regard to preferred and other embodiments, it will be understood by those persons skilled in the art that various modifications may be made thereto without departing from the scope of the inventions as defined in the claims appended hereto.

The invention claimed is:

1. A platform apparatus for producing hydrogen gas from water, comprising:
    a) a platform having a buoyant base configured for floating on a body of water, the base being securable to a bed of the body of water so as to allow for movement of the base resulting from wave motion of the body of water;
    b) a support member extending vertically upward from the base;
    c) a wind turbine rotationally coupled to the support member for transforming kinetic energy of wind into rotational energy;
    d) a generator coupled to the wind turbine for transforming the rotational energy generated by the wind turbine into direct current electrical energy;
    e) a pumping apparatus for collecting water from the body of water, wherein the pumping apparatus is powered by the movement of the base resulting from the wave motion of the body of water on the base, and wherein the pumping apparatus comprises a lower pump tube immersed in the body of water, which collects water from the body of water, an upper feed line that transports the collected water, and an air inlet connected to the lower tube to allow for intake and expulsion of air from the tube; and
    f) an electrolysis apparatus carried by the base for receiving the water collected by the pumping apparatus and for generating hydrogen gas from the collected water using the direct current electricity, wherein the electrolysis apparatus comprises an exchange chamber that receives the collected water from the upper feed line.

2. The apparatus of claim 1, wherein the electrolysis apparatus further comprises:
    a) a pair of electrodes located within the exchange chamber, being electrically connected to the generator and submerged in the collected water to allow the passage of electricity between the electrodes causing electrolysis; and
    b) a gas collection apparatus located in the exchange chamber adjacent the electrodes for collecting the hydrogen gas generated by electrolysis.

3. The apparatus of claim 2, further comprising a gearing system for driving the generator at a rotational speed greater than the rotational speed of the wind turbine.

4. The apparatus of claim 1, wherein the wind turbine is mounted on the support member for rotational movement about a vertical axis of rotation.

5. The apparatus of claim 4, wherein the wind turbine comprises a drive shaft mounted on the support member for rotation about the vertical axis of rotation, four equally spaced arms extending horizontally outwardly from the drive shaft, and a wind collector connected to each of the arms, the wind collectors having at least one vertically oriented wind catching surface.

6. The apparatus of claim 5, wherein the at least one wind catching surface comprises a convex surface and an opposed concave surface.

7. The apparatus of claim 1, wherein the platform apparatus comprises a single support member, and the wind turbine is a vertical axis wind turbine.

8. A platform apparatus for producing hydrogen gas from water comprising:
    a) a buoyant base configured for floating on a body of water;
    b) a support member extending vertically upward from the base;

c) a wind turbine rotationally coupled to the support member for transforming the kinetic energy of wind into rotational energy;
d) a generator coupled to the wind turbine for transforming the rotational energy generated by the wind turbine into direct current electrical energy;
e) a pumping apparatus for collecting water from the body of water, wherein the pumping apparatus is powered by the movement of the base resulting from the wave motion of the body of water on the base;
e) an electrolysis apparatus affixed to the base for receiving the water collected by the pumping apparatus and for generating hydrogen gas from the water using the direct current electricity;
f) wherein the pumping apparatus comprises:
  (i) a lower tube immersed in the body of water, having a lower flap valve at an inlet for allowing water to enter the lower tube but prevent its egress;
  (ii) an upper feed line for supplying the collected water to the electrolysis apparatus, and being connected to the lower tube via an upper flap valve, wherein the upper flap valve permits water to enter the upper feed line but prevents its egress; and
  (iii) an air inlet connected to the lower tube to allow for intake and expulsion of air from the tube;
  (iv) wherein the wave motion of the body of water causes the base to oscillate, alternately adding a water charge to the lower tube, and pumping that water charge into the upper feed line where the water charge is fed to the electrolysis apparatus.

9. The apparatus of claim 8, wherein the body of water is salt water, and the electrolysis apparatus produces hydrogen gas and chlorine from the salt water.

10. A platform apparatus for producing hydrogen gas from water, comprising:
a) a platform having a buoyant base configured for floating on a body of water, the base being securable to a bed of the body of water so as to allow for movement of the base resulting from wave motion of the body of water;
b) a support member extending vertically upward from the base;
c) a wind turbine rotationally coupled to the support member for transforming kinetic energy of wind into rotational energy;
d) a generator coupled to the wind turbine for transforming the rotational energy generated by the wind turbine into direct current electrical energy;
e) a pumping apparatus for collecting water from the body of water, wherein the pumping apparatus is powered by the movement of the base resulting from the wave motion of the body of water on the base;
f) an electrolysis apparatus carried by the base for receiving the water collected by the pumping apparatus and for generating hydrogen gas from the water using the direct current electricity, wherein the electrolysis apparatus comprises an exchange chamber for storing the water collected from the body of water and wherein electrolysis takes place, a pair of electrodes located within the exchange chamber, being electrically connected to the generator and submerged in the collected water to allow the passage of electricity between the electrodes causing electrolysis, and a gas collection apparatus located in the exchange chamber adjacent the electrodes for collecting the hydrogen gas generated by electrolysis; and
g) wherein the base comprises a ring of tubing, and a horizontally extending tubing member extending diametrically across the ring of tubing, wherein the electrolysis apparatus is located within the horizontally extending tubing member.

11. A platform apparatus for producing hydrogen gas from water, comprising:
a) a platform having a buoyant base configured for floating on a body of water, the base being securable to a bed of the body of water so as to allow for movement of the base resulting from wave motion of the body of water;
b) a support member extending vertically upward from the base;
c) a wind turbine rotationally coupled to the support member for transforming kinetic energy of wind into rotational energy;
d) a generator coupled to the wind turbine for transforming the rotational energy generated by the wind turbine into direct current electrical energy;
e) a pumping apparatus for collecting water from the body of water, wherein the pumping apparatus is powered by the movement of the base resulting from the wave motion of the body of water on the base;
f) an electrolysis apparatus carried by the base for receiving the water collected by the pumping apparatus and for generating hydrogen gas from the water using the direct current electricity, wherein the electrolysis apparatus comprises an exchange chamber for storing the water collected from the body of water and wherein electrolysis takes place, a pair of electrodes located within the exchange chamber, being electrically connected to the generator and submerged in the collected water to allow the passage of electricity between the electrodes causing electrolysis, and a gas collection apparatus located in the exchange chamber adjacent the electrodes for collecting the hydrogen gas generated by electrolysis, wherein the gas collection apparatus comprises at least one gas collection tube surrounding at least one of the electrode.

12. A platform apparatus for producing hydrogen gas from salt water, comprising
a) a platform having a buoyant base configured for floating on a body of water, and an anchor line for securing the base to a bed of the body of water so as to allow for movement of the base resulting from wave motion of the body of water;
b) a single support member extending vertically upward from the base;
c) a wind turbine rotationally coupled to the support member for transforming kinetic energy of wind into rotational energy, wherein the wind turbine comprises a drive shaft mounted for rotation about a vertical axis of rotation, four equally spaced arms extending horizontally outwardly from the drive shaft, and a wind collector connected to each of the arms, the wind collector having at least one vertically oriented wind catching surface;
d) a generator coupled to the drive shaft of the wind turbine for transforming the rotational energy generated by the wind turbine into direct current electrical energy;
e) a pumping apparatus for collecting water from the body of water, wherein the pumping apparatus is powered by the movement of the base resulting from the wave motion of the body of water on the base, and wherein the pumping apparatus comprises a lower pump tube immersed in the body of water, which collects water from the body of water, an upper feed line that transports the collected water, and an air inlet connected to the lower tube to allow for intake and expulsion of air from the tube; and f) an electrolysis apparatus comprising an exchange chamber located inside the base for storing the water collected by the pumping apparatus, a pair of electrodes located within the exchange chamber, the electrodes being electrically connected to the generator and submerged in the stored water to allow the passage of electricity between the electrodes causing electrolysis, and a gas collection apparatus located in the exchange chamber adjacent the electrodes for collecting hydrogen gas generated by the electrolysis.

13. The apparatus of claim 12 wherein the the lower pump tube has a lower flap valve at an inlet for allowing water to enter the lower tube but prevent its egress; and the upper feed line is connected to the lower tube via an upper flap valve, wherein the upper flap valve permits water to enter the upper feed line but prevents its egress; and wherein the wave motion of the body of water causes the base to oscillate, alternately adding a water charge to the lower tube, and pumping that water charge into the upper feed line where it is fed to the exchange chamber.

14. The apparatus of claim 12, wherein the water is salt water, and the electrolysis apparatus produces hydrogen gas and chlorine gas from the salt water.

15. The apparatus of claim 12, further comprising a gearing system for driving the generator at a rotational speed greater than the rotational speed of the wind turbine.

16. The apparatus of claim 12, wherein the base comprises a ring of tubing, foam inserts located within the ring for flotation, the foam inserts being covered with marine grade fiberglass for durability.

17. A system for producing hydrogen gas from salt water, comprising a plurality of platform apparatus flexibly secured together to form an array, the platform apparatus being interconnected to each other so as to allow each of the platform apparatus to move up and down and operate independently of each other, each of the platform apparatus comprising:
  a) a buoyant base configured for floating on a body of water;
  b) a support member extending vertically upward from the base;
  c) a vertical axis wind turbine rotationally coupled to the support member for transforming the kinetic energy of wind into rotational energy;
  d) a generator coupled to the wind turbine for transforming the rotational energy generated by the wind turbine into direct current electrical energy;
  e) a pumping apparatus for collecting salt water from the body of water, wherein the pumping apparatus is powered by wave motion of the body of water on the base, and wherein the pumping apparatus comprises a lower pump tube immersed in the body of water, which collects water from the body of water, an upper feed line that transports the collected water, and an air inlet connected to the lower tube to allow for intake and expulsion of air from the tube; and
  f) an electrolysis apparatus affixed to the base for receiving the salt water collected by the pumping apparatus and for generating hydrogen gas and chlorine gas from the salt water using the direct current electricity.

18. The system of claim 17 wherein the electrolysis apparatus comprises:
  a) an exchange chamber for storing the salt water collected from the body of water and wherein electrolysis takes place;
  b) a pair of electrodes located within the exchange chamber, being electrically connected to the generator and submerged in the collected salt water to allow the passage of electricity between the electrodes, causing electrolysis;
  c) a gas collection apparatus located in the exchange chamber adjacent the electrodes for collecting hydrogen gas and chlorine gas generated by the electrolysis.

19. A platform apparatus for producing hydrogen gas from water, comprising:
  a) a platform having a buoyant base configured for floating on a body of water, the base being securable to a bed of the body of water so as to allow for movement of the base resulting from wave motion of the body of water;
  b) a support member extending vertically upward from the base;
  c) a wind turbine rotationally coupled to the support member for transforming kinetic energy of wind into rotational energy;
  d) a generator coupled to the wind turbine for transforming the rotational energy generated by the wind turbine into direct current electrical energy;
  e) a pumping apparatus for collecting water from the body of water, wherein the pumping apparatus is powered by the movement of the base resulting from the wave motion of the body of water on the base; and
  f) an electrolysis apparatus carried by the base for receiving the water collected by the pumping apparatus and for generating hydrogen gas from the water using the direct current electricity;
  g) wherein the pumping apparatus comprises:
    (i) a lower tube immersed in the body of water, having a lower flap valve at an inlet for allowing water to enter the lower tube but prevent its egress;
    (ii) an upper feed line for supplying the collected water to the exchange chamber, and being connected to the lower tube via an upper flap valve, wherein the upper flap valve permits water to enter the upper feed line but prevents its egress; and
    (iii) an air inlet connected to the lower tube to allow for intake and expulsion of air from the tube;
    (iv) wherein the wave motion of the body of water causes the base to oscillate, alternately adding a water charge to the lower tube, and then pumping that water charge into the upper feed line where the water charge is fed to the exchange chamber.

* * * * *